United States Patent
Kimura et al.

(10) Patent No.: US 7,819,764 B2
(45) Date of Patent: Oct. 26, 2010

(54) SPEED CHANGE CONTROL DEVICE FOR BELT TYPE CONTINUOUSLY VARIABLE TRANSMISSION AND CONTROL METHOD THEREOF

(75) Inventors: Yusuke Kimura, Yokohama (JP); Tatsuo Ochiai, Chigasaki (JP)

(73) Assignee: JATCO Ltd, Fuji-shi (JP)

( * ) Notice: Subject to any disclaimer, the term of this patent is extended or adjusted under 35 U.S.C. 154(b) by 399 days.

(21) Appl. No.: 11/652,520

(22) Filed: Jan. 12, 2007

(65) Prior Publication Data
US 2007/0197320 A1   Aug. 23, 2007

(30) Foreign Application Priority Data
Feb. 8, 2006   (JP) .................. 2006-031083

(51) Int. Cl.
*F16H 61/00*   (2006.01)
*F16H 63/00*   (2006.01)
*F16H 61/66*   (2006.01)

(52) U.S. Cl. .................. 474/28; 474/18; 477/45; 477/46; 701/29; 701/51; 701/54

(58) Field of Classification Search .................. 474/18, 474/28
See application file for complete search history.

(56) References Cited

U.S. PATENT DOCUMENTS

| 5,624,349 | A  | * | 4/1997 | Yamamoto | 477/46 |
| 6,829,528 | B1 | * | 12/2004 | Kang et al. | 701/51 |
| 6,849,030 | B2 | * | 2/2005 | Yamamoto et al. | 477/159 |
| 2001/0046924 | A1 | * | 11/2001 | Tamura et al. | 477/45 |
| 2004/0110599 | A1 | * | 6/2004 | Jozaki et al. | 477/44 |
| 2004/0133318 | A1 | * | 7/2004 | Kang et al. | 701/29 |

FOREIGN PATENT DOCUMENTS

| JP | 10-225189 A | 8/1998 |
| JP | 2001-330118 A | 11/2001 |
| JP | 2001-330122 A | 11/2001 |

\* cited by examiner

*Primary Examiner*—Robert A Siconolfi
*Assistant Examiner*—San Aung
(74) *Attorney, Agent, or Firm*—Foley & Lardner LLP

(57) ABSTRACT

A speed change control device for a belt type continuously variable transmission has a speed change control unit (32) which controls an oil pressure for determining a speed ratio of the continuously variable transmission (10) by operating a step motor (40), and detects a rotation speed of a primary pulley or a secondary pulley. A driving speed of the step motor (40) is limited using two or more of a temperature of a working oil of the speed change control unit (32), the speed ratio of the continuously variable transmission (10), and the detected rotation speed as parameters.

12 Claims, 4 Drawing Sheets

SPEED CHANGE CONTROL DEVICE FOR BELT TYPE CONTINUOUSLY VARIABLE TRANSMISSION AND CONTROL METHOD THEREOF

FIELD OF THE INVENTION

This invention relates to specific control of a shifting speed in a speed change control device for a belt type continuously variable transmission.

BACKGROUND OF THE INVENTION

The speed ratio of a belt type continuously variable transmission is determined by a speed change control pressure supplied to a pulley cylinder chamber from a speed change control valve, and the speed change control pressure is adjusted by rotating a step motor to stroke the speed change control valve in an axial direction. Furthermore, by making a drive frequency of the step motor variable, the shifting speed can be varied.

JP10-225189A published by the Japan Patent Office describes a technique of controlling a shifting speed by making the drive frequency of a step motor variable in accordance with an oil temperature. At extremely low temperatures, the viscosity of the oil increases, and as a result, the driving force required to drive a spool of the speed change control valve cannot be obtained in the step motor, causing the motor to fall out of step. To prevent this, the drive frequency of the step motor is limited to a low frequency such that the shifting speed decreases. A technique whereby the drive frequency is limited to a low frequency at high temperatures to prevent oil leakage, which causes reductions in the amount of oil, is also known.

SUMMARY OF THE INVENTION

Speed change responsiveness at times such as when a driver depresses an accelerator pedal requires improvement, but when the prior art described above is applied, the drive frequency is limited to a low frequency according to the oil temperature, and as a result, the shifting speed cannot be increased.

An object of this invention is to improve speed change responsiveness while controlling the drive frequency to prevent a step motor from falling out of step.

In order to achieve the object, this invention provides a speed change control device for a continuously variable transmission in which a belt is wrapped around a primary pulley into which an output of a drive source is input and a secondary pulley which is connected to an output side of a drive system of a vehicle, and which changes a rotation speed of the drive source continuously and outputs the rotation speed by altering a groove width of the primary pulley and the secondary pulley. The device comprises a speed change oil pressure control unit which controls an oil pressure for determining a speed ratio of the continuously variable transmission by operating a motor, and a controller which detects a rotation speed of the primary pulley or the secondary pulley, limits a driving speed of the motor using two or more of a temperature of a working oil of the speed change oil pressure control unit, the speed ratio of the continuously variable transmission, and the detected rotation speed as parameters.

According to this invention, the driving speed of the motor is limited using two or more of the temperature of the working oil, the speed ratio, and the rotation speed of the pulleys as parameters, and hence the shifting speed can be set appropriately in accordance with variation in the viscosity of the working oil depending on the temperature thereof, the oil pressure required by the pulleys, the balance in the amount of working oil, and so on.

DESCRIPTION OF THE PREFERRED EMBODIMENTS

Figure 1:
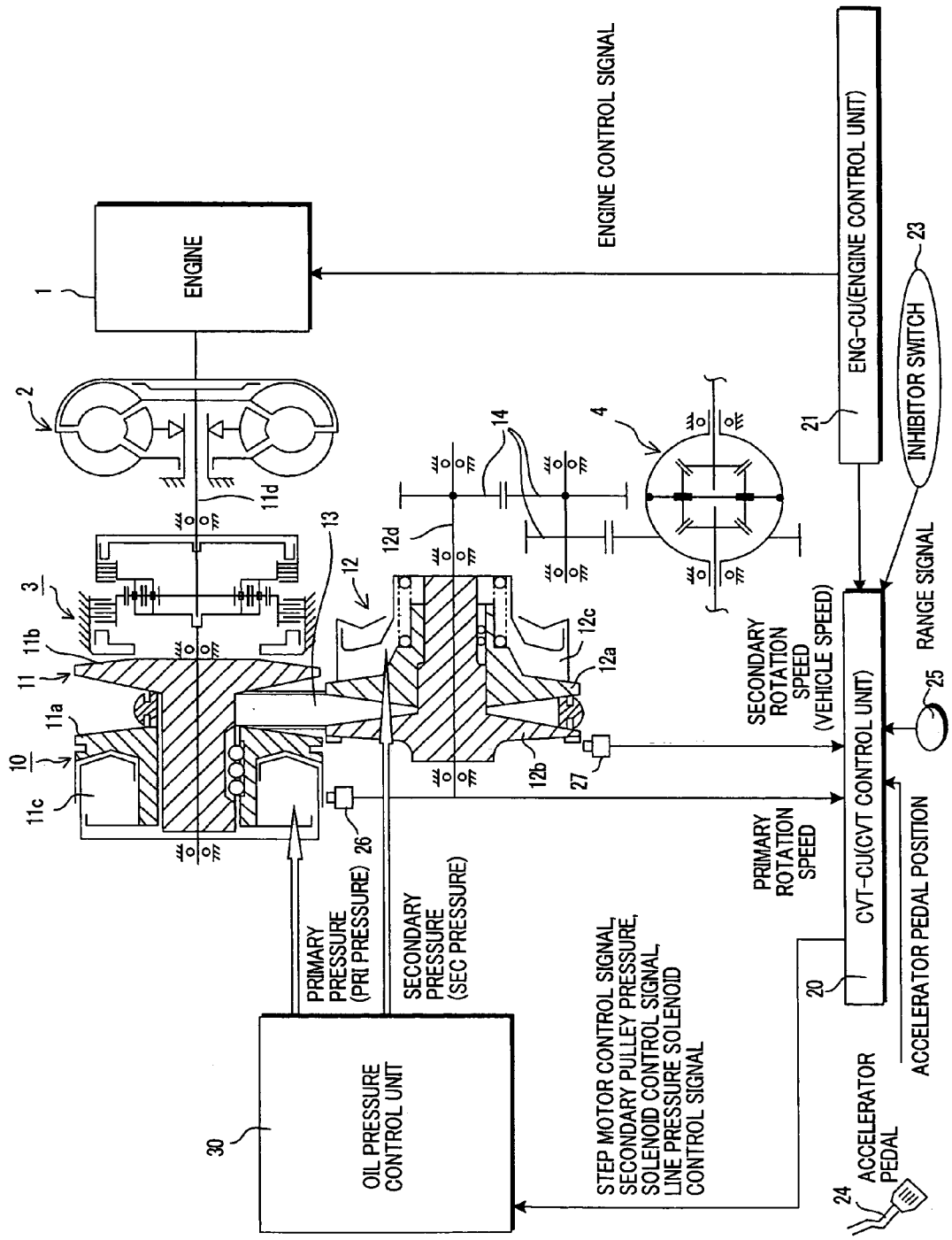
FIG. 1 is a schematic diagram showing a speed change control device for a belt type continuously variable transmission according to an embodiment.

An embodiment of this invention will be described in detail below with reference to the drawings and so on. FIG. 1 is a schematic diagram showing a speed change control device for a belt type continuously variable transmission according to an embodiment. A belt type continuously variable transmission 10 comprises a primary pulley 11, a secondary pulley 12, a V belt 13, a CVT control unit 20 (CVTCU hereafter), and an oil pressure control unit 30.

The primary pulley 11 is an input shaft side pulley which inputs the rotation of an engine 1 into the belt type continuously variable transmission 10. The primary pulley 11 comprises a fixed conical plate 11$b$ which rotates integrally with an input shaft 11$d$, and a movable conical plate 11$a$ which is disposed opposite the fixed conical plate 11$b$ to form a V-shaped pulley groove, and which can be displaced axially by oil pressure acting on a primary pulley cylinder chamber 11$c$. The primary pulley 11 is connected to the engine 1 via a forward-reverse switching mechanism 3 and a torque converter 2 comprising a lockup clutch, and inputs the rotation of the engine 1. The rotation speed of the primary pulley 11 is detected by a primary pulley rotation speed sensor 26.

The belt 13 is wrapped around the primary pulley 11 and secondary pulley 12 such that the rotation of the primary pulley 11 is transmitted to the secondary pulley 12.

The secondary pulley 12 outputs the rotation transmitted by the belt 13 to a differential 4. The secondary pulley 12 comprises a fixed conical plate 12$b$ which rotates integrally with an output shaft 12$d$, and a movable conical plate 12$a$ which is disposed opposite the fixed conical plate 12$b$ to form a V-shaped pulley groove, and which can be displaced axially in accordance with oil pressure acting on a secondary pulley cylinder chamber 12$c$. It should be noted that the pressure-receiving surface area of the secondary pulley cylinder chamber 12$c$ is set substantially equally to the pressure-receiving surface area of the primary pulley cylinder chamber 11$c$.

The secondary pulley 12 is connected to the differential 4 via an idler gear 14 and an idler shaft, and outputs rotation to the differential 4. The rotation speed of the secondary pulley 12 is detected by a secondary pulley rotation speed sensor 27. The vehicle speed may be calculated from the rotation speed of the secondary pulley 12.

The CVTCU 20 determines the speed ratio (a value obtained by dividing the effective radius of the secondary pulley 12 by the effective radius of the primary pulley 11) and a contact frictional force on the basis of signals from an inhibitor switch 23, an accelerator pedal position sensor 24, an oil temperature sensor 25, the primary pulley rotation speed sensor 26, the secondary pulley rotation speed sensor 27, and so on, as well as input torque information from an engine control unit 21, by referring to a speed change line prepared in advance, and controls the belt type continuously variable transmission 10 by transmitting commands to the oil pressure control unit 30.

The oil pressure control unit 30 operates on the basis of the commands from the CVTCU 20. The oil pressure control unit 30 causes the movable conical plate 11a and the movable conical plate 12a to reciprocate in a rotary axis direction by supplying oil pressure to the primary pulley 11 and secondary pulley 12.

When the movable conical plate 11a and the movable conical plate 12a move, the pulley groove width varies, and as a result, the belt 13 moves over the primary pulley 11 and secondary pulley 12. Thus, the contact radius between the belt 13 and the primary pulley 11 and secondary pulley 12 varies, whereby the speed ratio and the contact frictional force of the belt 13 are controlled.

The rotation of the engine 1 is input into the belt type continuously variable transmission 10 via the torque converter 2 and the forward-reverse switching mechanism 3, and transmitted from the primary pulley 11 to the differential 4 via the belt 13 and secondary pulley 12.

When the accelerator pedal is depressed or a shift change is performed in a manual mode, the movable conical plate 11a of the primary pulley 11 and the movable conical plate 12a of the secondary pulley 12 are axially displaced, thereby varying the contact radius thereof with the belt 13 such that the speed ratio is varied continuously.

The speed ratio is set on the basis of a map on which a plurality of speed change lines indicating the relationship between the vehicle speed and the primary rotation speed are prepared for each throttle opening, by looking up a primary rotation speed that corresponds to the vehicle speed and the throttle opening.

Figure 2:
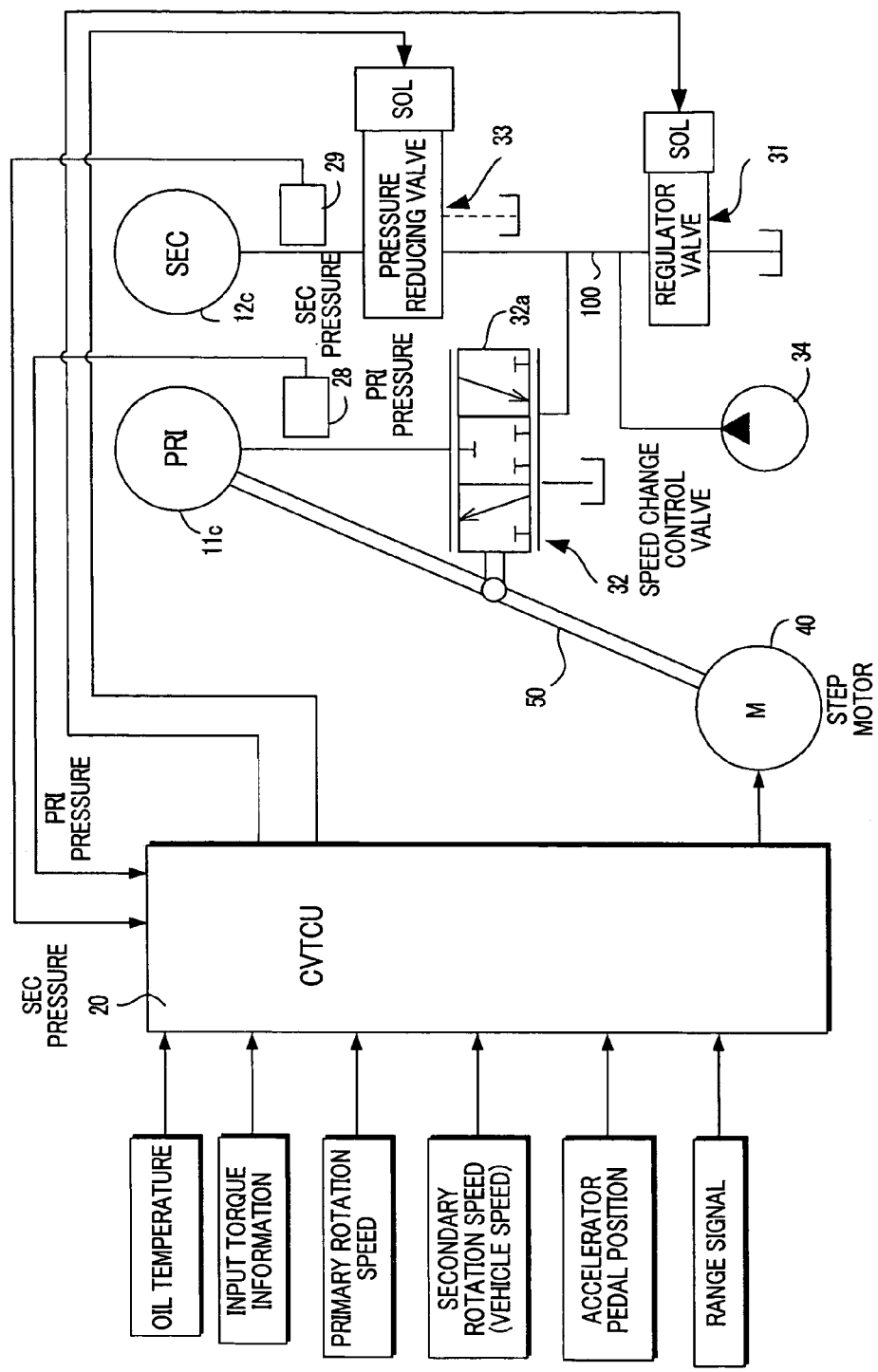
FIG. 2 is a schematic diagram of an oil pressure control unit and a CVTCU.

FIG. 2 is a schematic diagram of the oil pressure control unit and the CVTCU.

The oil pressure control unit 30 comprises a regulator valve 31, a speed change control valve 32, and a pressure reducing valve 33. The oil pressure control unit 30 controls the oil pressure supplied by an oil pump 34, and supplies the oil pressure to the primary pulley 11 and secondary pulley 12.

The regulator valve 31 is a pressure regulating valve which comprises a solenoid and regulates the pressure of the oil pumped by the oil pump 34 to a predetermined line pressure in accordance with a command (for example, a duty signal or the like) from the CVTCU 20 and in accordance with the driving conditions.

The speed change control valve 32 is a control valve which controls the oil pressure (primary pressure hereafter) in the primary pulley cylinder chamber 11c to a desired target pressure. The speed change control valve 32 is connected to a servo link 50 constituting a mechanical feedback mechanism. The speed change control valve 32 is driven by a step motor 40 connected to one end of the servo link 50, and receives feedback regarding the groove width, or in other words the actual speed ratio, from the movable conical plate 11a of the primary pulley 11, which is connected to the other end of the servo link 50. The speed change control valve 32 regulates the primary pressure by absorbing and discharging the oil pressure of the primary pulley cylinder chamber 11c in accordance with the displacement of a spool 32a, thereby realizing a target speed ratio which is instructed according to a drive position of the step motor 40, and when the speed change is actually complete, the speed change control valve 32 receives the displacement from the servo link 50 and holds the spool 32a in a closed position.

The pressure reducing valve 33 is a control valve which comprises a solenoid and controls the pressure (secondary pressure hereafter) that is supplied to the secondary pulley cylinder chamber 12c to a desired target pressure.

The line pressure supplied by the oil pump 34 and regulated by the regulator valve 31 is supplied to the speed change control valve 32 and the pressure reducing valve 33, respectively.

The speed ratio of the primary pulley 11 and secondary pulley 12 is controlled by the step motor 40, which is driven in accordance with a speed change command signal from the CVTCU 20. The spool 32a of the speed change control valve 32 is driven in accordance with the displacement of the servo link 50, which operates in conjunction with the step motor 40, and thus the line pressure supplied to the speed change control valve 32 is regulated such that the primary pressure is supplied to the primary pulley 11. Hence, the groove width is variably controlled and set to a predetermined speed ratio.

Here, the drive frequency of the step motor determines the operating speed of the step motor, and as the drive frequency increases, the operating speed rises. Furthermore, the primary pressure varies according to the step motor operation, and hence the shifting speed of the transmission increases as the operating speed rises. Accordingly, by making the drive frequency variable, the shifting speed can be varied.

The CVTCU 20 variably controls the speed ratio and the contact frictional force of the V belt 13 by reading a range signal from the inhibitor switch 23, an accelerator pedal position from the accelerator pedal position sensor 24, an oil temperature of the belt type continuously variable transmission 10 from the oil temperature sensor 25, signals from the primary pulley rotation speed sensor 26, secondary pulley rotation speed sensor 27, oil pressure sensors 28, 29, and so on. It should be noted that the oil pressure sensor 28 is a sensor which detects the primary pressure applied to the primary pulley cylinder chamber 11c, while the oil pressure sensor 29 is a sensor which detects the secondary pressure applied to the secondary pulley cylinder chamber 12c.

Figure 3:
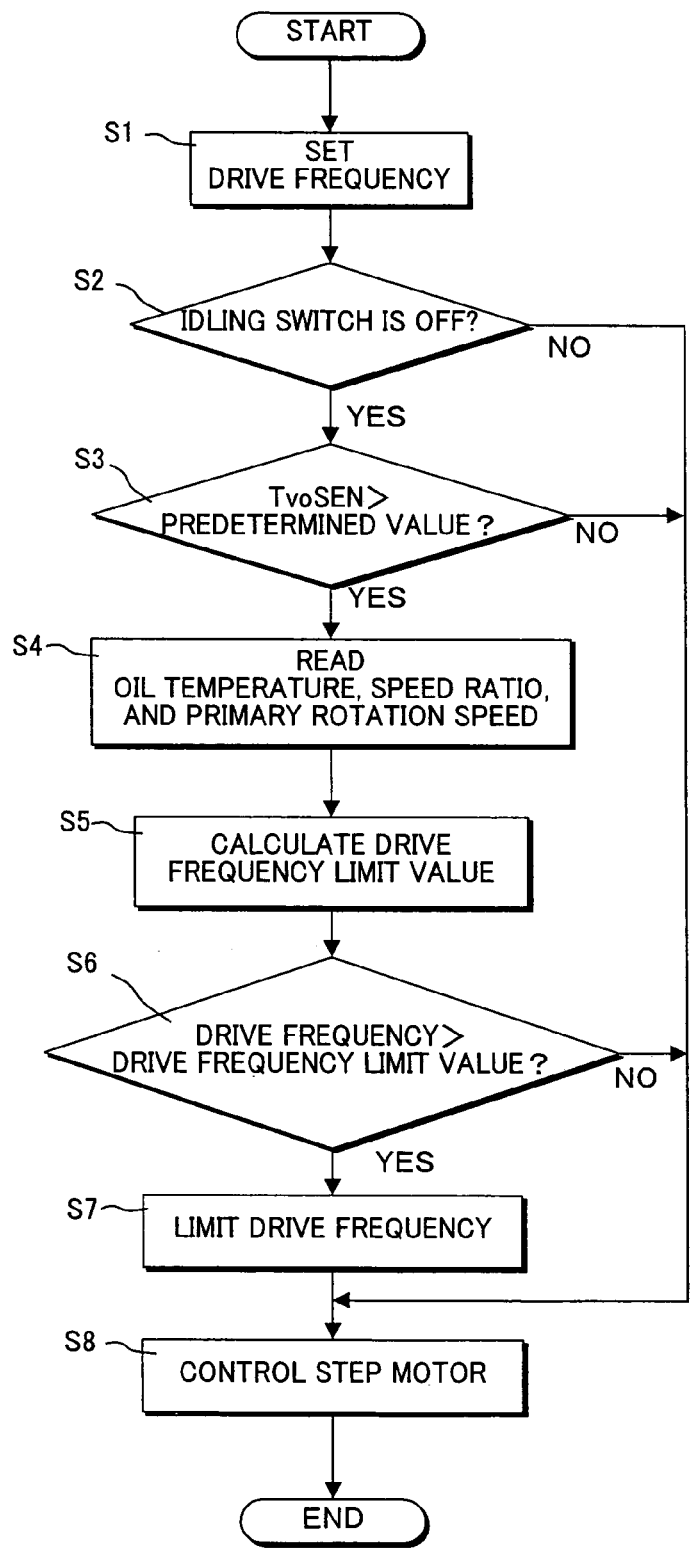
FIG. 3 is a flowchart showing the control of the speed change control device for a belt type continuously variable transmission according to this embodiment.

The control performed by the CVTCU 20 will be described below with reference to the flowchart in FIG. 3. FIG. 3 is a flowchart showing control of the speed change control device for a belt type continuously variable transmission according to this embodiment. This control is performed repeatedly at brief intervals (of 10 ms, for example).

In a step S1, the drive frequency of the step motor 40 is set. The drive frequency is set at a frequency corresponding to a maximum value of the operating speed of the step motor 40.

In a step S2, a determination is made as to whether or not an idling switch is OFF. If the idling switch is OFF, the routine advances to a step S3, and if the idling switch is ON, the routine advances to a step S8. The idling switch switches ON when the engine 1 is in an idling state, and remains OFF at all other times. When the idling switch is ON, substantially no torque is input into the continuously variable transmission 10 from the engine 1, and hence the drive frequency need not be limited to a low frequency. Accordingly, the drive frequency set in the step S1 is maintained.

In the step S3, a determination is made as to whether or not a throttle valve opening TvoSEN is larger than a predetermined value. When the throttle valve opening TvoSEN is larger than the predetermined value, the routine advances to a step S4, and when the throttle valve opening TvoSEN is equal to or smaller than the predetermined value, the routine advances to a step S8. The predetermined value is set to a value in the vicinity of zero, at which substantially no torque is input into the transmission 10 from the engine 1. Here, even when the driver attempts to keep the accelerator pedal position constant, the position varies within a minute range, and therefore the predetermined value preferably possesses hysteresis. When the throttle valve opening TvoSEN is equal to or smaller than the predetermined value, substantially no torque is input into the continuously variable transmission 10 from the engine 1, and hence the drive frequency need not be limited to a low frequency. Accordingly, the drive frequency set in the step S1 is maintained.

In the step S4, the oil temperature, speed ratio, and primary rotation speed are read.

Figure 4:
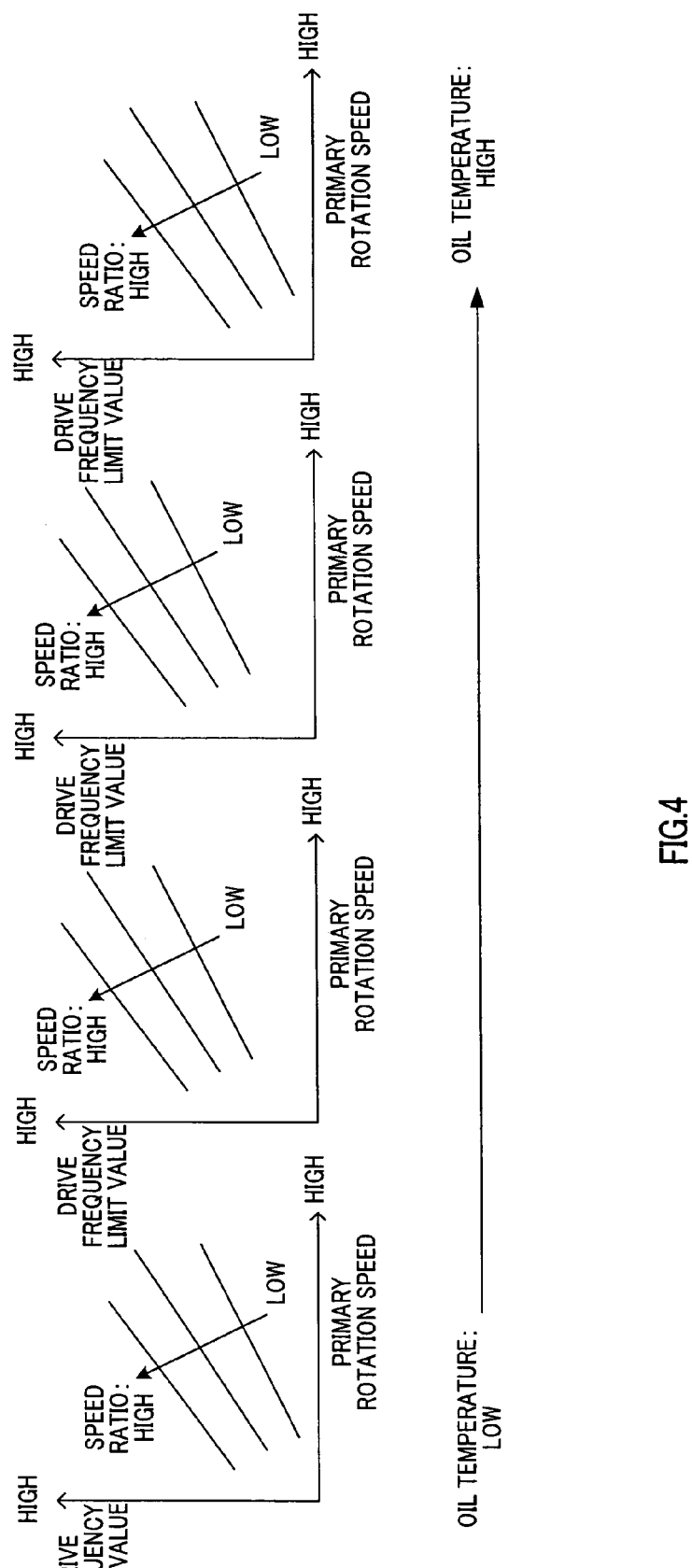
FIG. 4 is a map showing the relationship between a primary rotation speed, a speed ratio, an oil temperature, and a drive frequency.

In a step S5, a drive frequency limit value of the step motor 40 is calculated by referring to a map shown in FIG. 4. FIG. 4 is a map showing the relationship between the primary rotation speed, drive frequency, and speed ratio at each oil temperature.

As shown in FIG. 4, when the speed ratio and oil temperature are constant, the drive frequency limit value is set increasingly lower as the primary rotation speed decreases. Here, when the primary rotation speed, or in other words the engine rotation speed, is low, the discharge rate of the oil pump 34 decreases, and the resulting lack of working oil makes securing the required oil pressure difficult. By setting the drive frequency limit value to a low value such that the shifting speed is limited, the required oil pressure can be secured.

When the oil temperature and primary rotation speed are constant, the drive frequency limit value is set increasingly lower as the speed ratio shifts to the low side. As the speed ratio shifts further toward the low side, the contact radius of the belt 13 must be increased by reducing the pulley width of the secondary pulley 12. In other words, the required oil pressure increases as the speed ratio shifts toward the low side, and therefore the time required for securing the oil pressure lengthens. Hence, by setting the drive frequency limit value low to limit the shifting speed, the required oil pressure is secured reliably.

Further, when the speed ratio and primary rotation speed are constant, the drive frequency limit value is set low at low and high oil temperatures. At extremely low temperatures, the viscosity of the working oil increases, and as a result, it may be impossible to obtain the driving force required for the step motor 40 to drive the spool 32a of the speed change control valve 32, causing the step motor 40 to fall out of step. Further, when the temperature of the working oil is high, the amount of leakage increases, causing a deficiency in the amount of oil such that the required oil pressure cannot be secured easily. Hence, by setting the drive frequency limit value to a low value such that the shifting speed is limited, the step motor 40 is prevented from falling out of step, and the required oil pressure is secured.

Here, the vehicle speed may be used instead of the primary rotation speed. In this case, the map of FIG. 4 shows similar trends to those exhibited when the primary rotation speed is used.

In a step S6, a determination is made as to whether or not the drive frequency is larger than the drive frequency limit value. When the drive frequency is larger than the drive frequency limit value, the routine advances to a step S7, and when the drive frequency is equal to or smaller than the drive frequency limit value, the routine advances to the step S8.

In the step S7, the drive frequency is limited to the drive frequency limit value calculated in the step S5.

In the step S8, the step motor 40 is drive-controlled on the basis of the drive frequency.

In the embodiment described above, the drive frequency of the step motor 40 is limited on the basis of the working oil temperature, the speed ratio, and the primary rotation speed, and hence the shifting speed can be set appropriately in accordance with variation in the oil pressure required by the pulleys 11, 12 and the balance in the amount of working oil, in addition to variation in the viscosity of the working oil depending on its temperature. As a result, oil pressure deficiencies are prevented so that the required oil pressure is secured reliably, and the shifting speed is not limited unnecessarily, enabling an improvement in speed change responsiveness.

Further, the drive frequency is limited to a lower frequency as the speed ratio shifts toward the low side, and hence the shifting speed decreases as the oil pressure required by the secondary pulley 12 increases. Thus, the required oil pressure can be secured reliably, regardless of variation in the speed ratio.

Further, the drive frequency is limited to a lower frequency as the rotation speed of the primary pulley 11 decreases, and therefore the shifting speed decreases as the engine rotation speed falls such that the discharge rate of the oil pump 34 decreases. Thus, the required oil pressure can be secured reliably, regardless of the oil balance.

Further, when it is determined that the idling switch is ON or that the opening TvoSEN of the throttle valve is equal to or smaller than the predetermined value, the drive frequency is set at the current drive frequency, and hence when a speed change is performed under driving conditions in which substantially no torque is input into the transmission 10, the speed change operation can be performed swiftly without limiting the drive frequency.

This invention is not limited to the embodiment described above, and may be subjected to various alterations and modifications within the technical scope thereof.

For example, in this embodiment, the drive frequency of the step motor 40 is limited on the basis of the working oil temperature, the speed ratio, and the primary rotation speed, but the present invention is not limited thereto, and the drive frequency may be limited on the basis of the working oil temperature and the speed ratio. In so doing, the shifting speed can be set appropriately in accordance with variation in the oil pressure required by the pulleys 11, 12 as well as variation in the viscosity of the working oil depending on its temperature, and thus the speed change responsiveness can be improved.

The drive frequency of the step motor 40 may also be limited on the basis of the working oil temperature and the primary rotation speed. In so doing, the shifting speed can be set appropriately in accordance with the balance in the amount of working oil as well as variation in the viscosity of the working oil depending on its temperature, and thus the speed change responsiveness can be improved.

This application claims priority from Japanese Patent Application 2006-031083, filed Feb. 8, 2006, which is incorporated herein by reference in its entirety.

What is claimed is:

1. A speed change control device for a continuously variable transmission in which a belt is wrapped around a primary pulley into which an output of a drive source is input and a secondary pulley which is connected to an output side of a drive system of a vehicle, and which changes a rotation speed of the drive source continuously and outputs the rotation speed by altering a groove width of the primary pulley and the secondary pulley, the device comprising:

a speed change oil pressure control unit which controls an oil pressure for determining a speed ratio of the continuously variable transmission;

a motor which drives a valve of the speed change oil pressure control unit; and a controller, wherein the controller detects a rotation speed of the primary pulley or the secondary pulley, and limits a driving speed of the motor based on a temperature of a working oil of the speed change oil pressure control unit and one or more of the speed ratio of the continuously variable transmission and the detected rotation speed, and the driving speed of the motor is limited to a lower speed as the temperature of the working oil falls outside of a predetermined temperature range, as the speed ratio shifts toward a low side, and as the detected rotation speed decreases.

2. The speed change control device as defined in claim 1, further comprising an engine as the drive source, wherein the controller prohibits limitation of the driving speed when a throttle opening of the engine is smaller than a predetermined low opening.

3. A speed change control method for a continuously variable transmission in which a belt is wrapped around a primary pulley into which an output of a drive source is input and a secondary pulley which is connected to an output side of a drive system of a vehicle, which changes a rotation speed of the drive source continuously and outputs the rotation speed by altering a groove width of the primary pulley and the secondary pulley, and which includes a speed change oil pressure control unit which controls an oil pressure for determining a speed ratio of the continuously variable transmission and a motor which drives a valve of the speed change oil pressure control unit, the method comprising:

detecting a rotation speed of the primary pulley or the secondary pulley; and limiting a driving speed of the motor based on a temperature of a working oil of the speed change oil pressure control unit and one or more of the speed ratio of the continuously variable transmission and the detected rotation speed, wherein the driving speed of the motor is limited to a lower speed as the temperature of the working oil falls outside of a predetermined temperature range, as the speed ratio shifts toward a low side, and as the detected rotation speed decreases.

4. The speed change control method as defined in claim 3, wherein an engine is the drive source, wherein the limiting a driving speed of the motor prohibits limitation of the driving speed when a throttle opening of the engine is smaller than a predetermined low opening.

5. A speed change control device for a continuously variable transmission in which a belt is wrapped around a primary pulley into which an output of a drive source is input and a secondary pulley which is connected to an output side of a drive system of a vehicle, and which changes a rotation speed of the drive source continuously and outputs the rotation speed by altering a groove width of the primary pulley and the secondary pulley, the device comprising:

pulley rotation speed detecting means for detecting a rotation speed of the primary pulley or the secondary pulley;

a speed change oil pressure control unit which controls an oil pressure for determining a speed ratio of the continuously variable transmission;

a motor which drives a valve of the speed change oil pressure control unit; and driving speed limiting means for limiting a driving speed of the motor based on a temperature of a working oil of the speed change oil pressure control unit and one or more of the speed ratio of the continuously variable transmission and the detected rotation speed, wherein the driving speed of the motor is limited to a lower speed as the temperature of the working oil falls outside of a predetermined temperature range, as the speed ratio shifts toward a low side, and as the detected rotation speed decreases.

6. The speed change control device as defined in claim 5, further comprising an engine as the drive source, wherein the driving speed limiting means prohibits limitation of the driving speed when a throttle opening of the engine is smaller than a predetermined low opening.

7. The speed change control device as defined in claim 1, wherein the controller limits the driving speed of the motor based on the temperature of the working oil of the speed change oil pressure control unit, the speed ratio of the continuously variable transmission, and the detected rotation speed.

8. The speed control method as defined in claim 3, wherein limiting the driving speed limits the driving speed of the motor based on the temperature of the working oil of the speed change oil pressure control unit, the speed ratio of the continuously variable transmission, and the detected rotation speed.

9. The speed change control device as defined in claim 5, wherein the driving speed limiting means limits the driving speed of the motor based on the temperature of the working oil of the speed change oil pressure control unit, the speed ratio of the continuously variable transmission, and the detected rotation speed.

10. The speed change control device as defined in claim 1, wherein a highest temperature in the predetermined temperature range is lower than a temperature at which a required oil pressure cannot be secured and a lowest temperature in the predetermined temperature range is higher than a temperature at which the motor falls out of step.

11. The speed control method as defined in claim 3, wherein a highest temperature in the predetermined temperature range is lower than a temperature at which a required oil pressure cannot be secured and a lowest temperature in the predetermined temperature range is higher than a temperature at which the motor falls out of step.

12. The speed change control device as defined in claim 5, wherein a highest temperature in the predetermined temperature range is lower than a temperature at which a required oil pressure cannot be secured and a lowest temperature in the predetermined temperature range is higher than a temperature at which the motor falls out of step.

* * * * *